(No Model.) 4 Sheets—Sheet 1.
P. TIEDEMANN.
POTATO DIGGER.

No. 539,314. Patented May 14, 1895.

Witnesses
Nettie Leighton
J. J. Beitinger

Inventor
Paul Tiedemann
by Wm. M. Monroe
Attorney (No Model.)   P. TIEDEMANN.   4 Sheets—Sheet 2.
POTATO DIGGER.

No. 539,314. Patented May 14, 1895.

(No Model.) 4 Sheets—Sheet 3.
P. TIEDEMANN.
POTATO DIGGER.

No. 539,314. Patented May 14, 1895.

Witnesses
Nettie Leighton
J. J. Breitinger

Inventor
Paul Tiedemann
by Wm. M. Monroe
Attorney (No Model.) 4 Sheets—Sheet 4.
P. TIEDEMANN.
POTATO DIGGER.

No. 539,314. Patented May 14, 1895.

Witnesses
Nettie Leighton
J. J. Breitinger

Inventor
Paul Tiedemann
by Wm. M. Monroe
Attorney

UNITED STATES PATENT OFFICE.

PAUL TIEDEMANN, OF CLEVELAND, OHIO.

POTATO-DIGGER.

SPECIFICATION forming part of Letters Patent No. 539,314, dated May 14, 1895.

Application filed April 12, 1894. Serial No. 507,336. (No model.)

*To all whom it may concern:*

Be it known that I, PAUL TIEDEMANN, a citizen of the United States, and a resident of Cleveland, county of Cuyahoga, State of Ohio, have invented certain new and useful Improvements in Potato-Diggers, of which I hereby declare the following to be a full, clear, and exact description, such as will enable others skilled in the art to which it appertains to make and use the same.

My invention relates to improvements in potato digging and distributing machines, designed for the purpose of digging the potatoes, freeing them from dirt and spreading them over the ground within easy reach for removal.

My invention consists in the employment of a vertically adjustable shovel, in connection with an oscillating sifter upon which the potatoes are received and cleansed, and means for elevating and distributing the potatoes, with the combination and arrangement of the various parts, and construction of details, as hereinafter described, shown in the accompanying drawings and more specifically pointed out in the claim.

Figure 1:
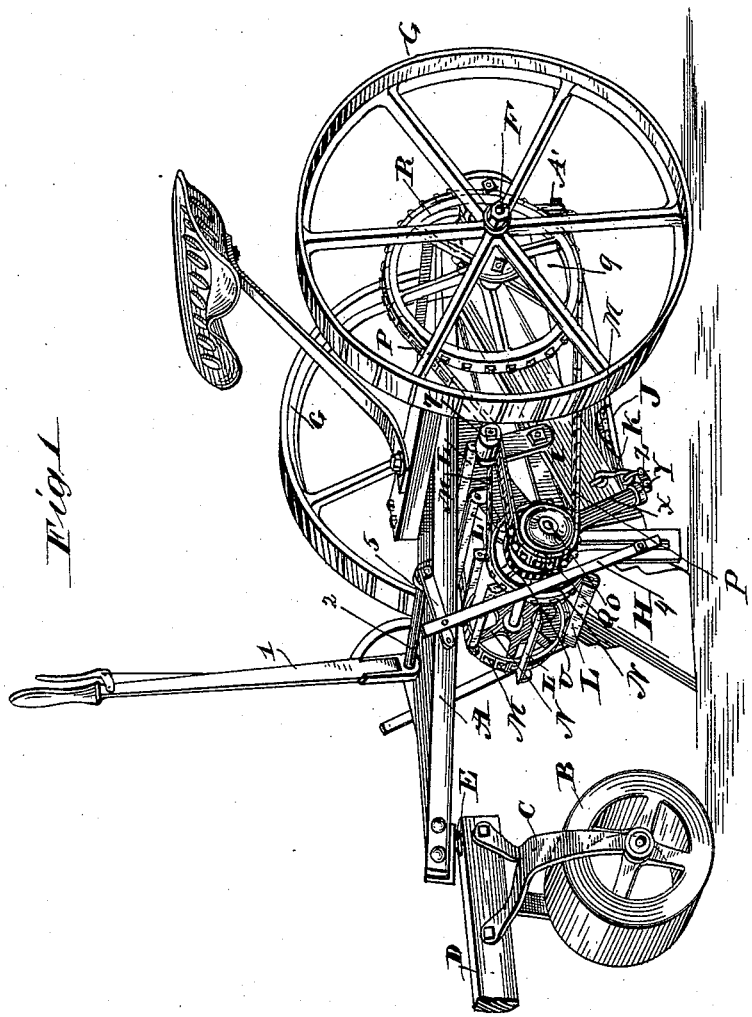
Figure 2:
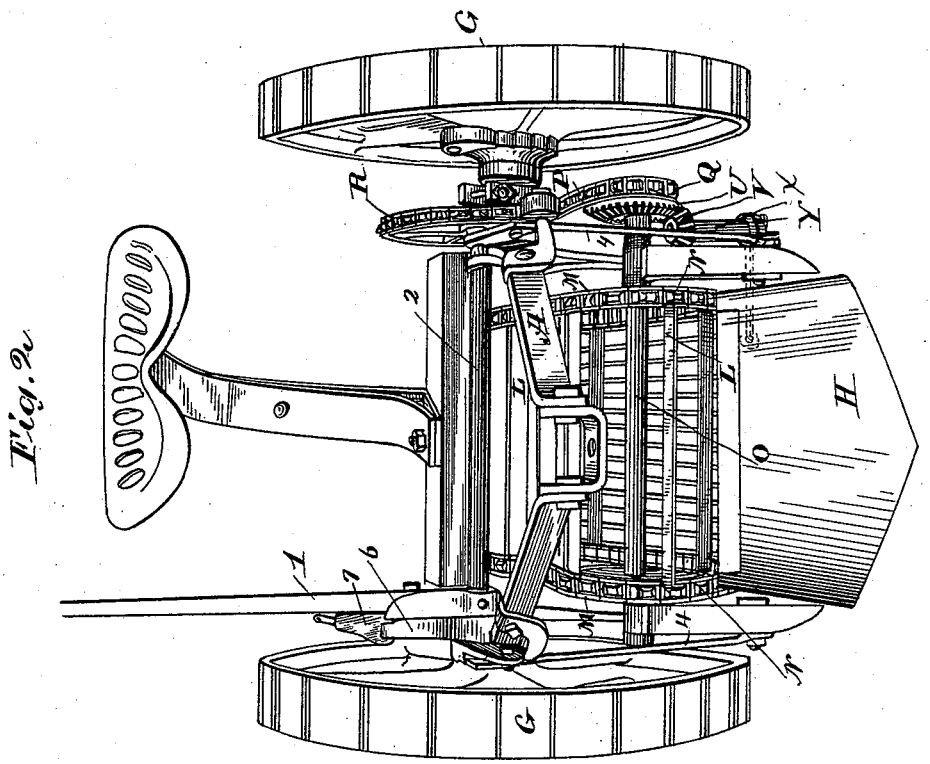
Figure 3:
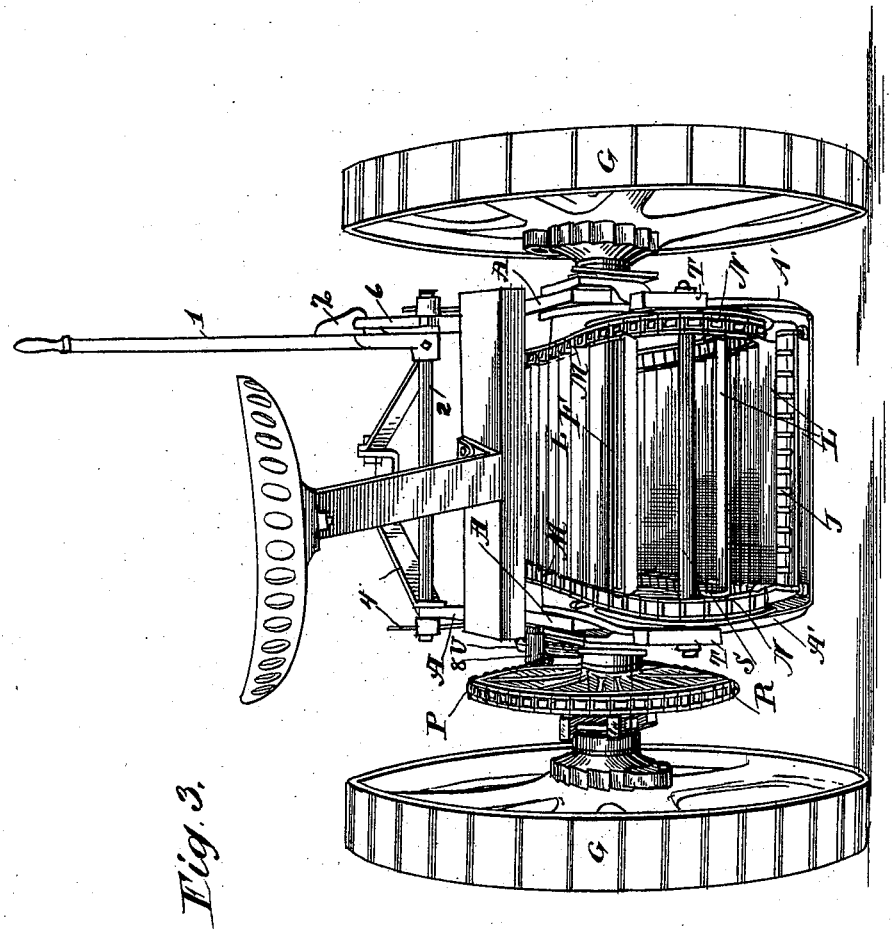
Figure 4:
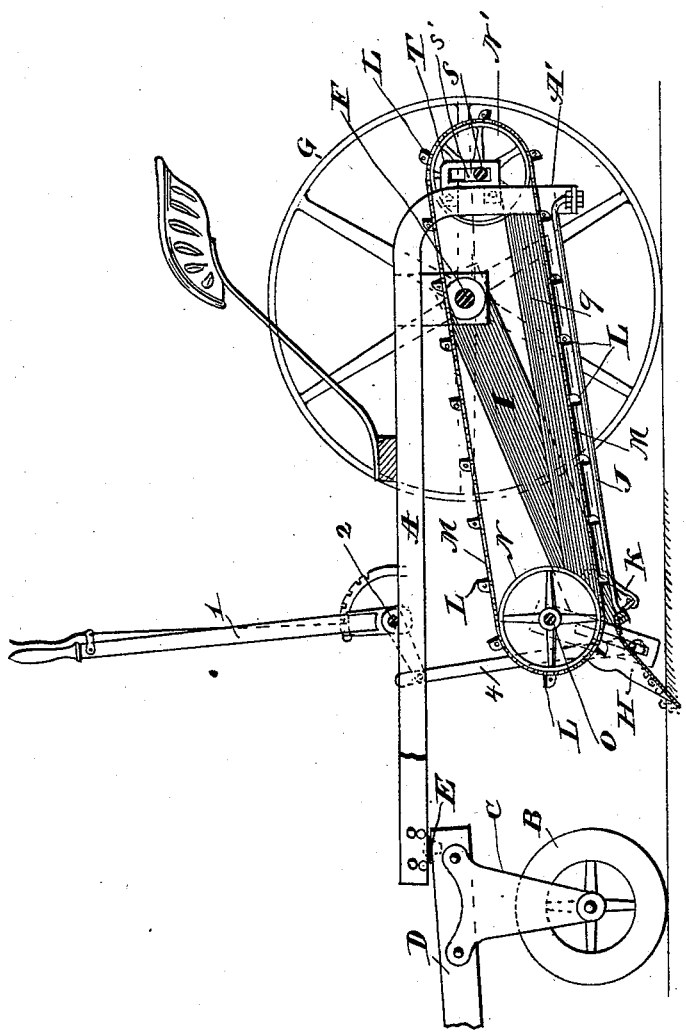

In the drawings, Figure 1 is a perspective view of the machine. Fig. 2 is a front view, and Fig. 3 is a rear view, of the same. Fig. 4 is a side view, in vertical section, on the center line.

In the figures A is the main frame of the machine supported in front by the roller B, mounted in the fork C, and the pole D, swiveled at E, to the frame. In the rear the frame A is mounted upon the main axle F and wheels G. A plow scoop H adapted to enter the ground and remove the potatoes with the inclosing earth is secured to the side frames I, through one end of which the wheel axle passes. Suspended from these side frames in front by hooks K is the oscillating grate J which is supported in the rear by arms A' depending from the main frame A, in such a manner as to give a slight elevation to the rear portion. Over this grate and in contact with its bars move the carrier strips L, secured to the chains M, M, moving over sprocket wheels N, N', in such a manner as to raise the potatoes and large lumps of earth or stones over the grate to the upper end, and distribute them over the ground in the rear. The shaft O actuates the carrier wheels and is driven in turn by the driving chain P, and sprocket wheels Q, and R, driven from the main axle.

The rear sprocket wheel shaft S for the carrier chains is mounted in bearings S' vertically adjustable in the slotted seats T in the rear arms A', the object of which is to permit the carrier to raise above the grate bars if any obstruction should enter, too large to readily pass.

U is a bevel gear and V a pinion driving the vertical shaft W, moving in the sleeve X, and operating the crank disk Y, to which the rod Z connecting with the swinging grate is pivoted. The constant oscillation thus produced causes all fine dirt to fall through the bars of the grate, and potatoes are delivered free from covering at the rear, with sticks and stones too large to go through the bars, but which will not cover up the potatoes.

In operation, the heavy roller B going in front of the machine serves to break up any crusts on the earth, and lay weeds or straw smoothly down so that they will lie in the carrier without difficulty, and pass out in the rear. The scoop can be raised or lowered by means of the lever 1, rod 2, arms 5 and side rods 4, and is fixed in position by the arc 6, and trigger 7, thus accommodating itself to light or heavy soils, or depth of the potatoes. 8 is an idler adapted to tighten the driving chain.

9 is a side board at either side of the grate and carrier chain which serves to retain the potatoes until they are dumped in the rear.

Having described my invention, what I claim as new, and desire to secure by Letters Patent, is—

In a potato digger, the frame A, having the downwardly turned arm A', provided with the slotted portion T, the oscillating grate supported at its rear end upon the downwardly turned arm, and the frame I upon which the front end of the grate is supported, combined with the endless carrier L, M, having its rear end journaled in the slotted portion T, so as to be automatically adjustable at this point, and mechanisms for operating the carrier and the grate, substantially as shown.

PAUL TIEDEMANN.

Witnesses:
WM. M. MONROE,
GEO. O. WILLET.